US010052253B2

(12) United States Patent
Shirato et al.

(10) Patent No.: US 10,052,253 B2
(45) Date of Patent: Aug. 21, 2018

(54) HAND-PROPELLED VEHICLE

(71) Applicant: Murata Manufacturing Co., Ltd., Kyoto (JP)

(72) Inventors: Kenichi Shirato, Kyoto (JP); Shigeru Tsuji, Kyoto (JP); Masayuki Kubo, Kyoto (JP); Yoshitaka Hane, Kyoto (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 246 days.

(21) Appl. No.: 15/185,306

(22) Filed: Jun. 17, 2016

(65) Prior Publication Data

US 2016/0296411 A1 Oct. 13, 2016

Related U.S. Application Data

(63) Continuation of application No. PCT/JP2014/083652, filed on Dec. 19, 2014.

(30) Foreign Application Priority Data

Dec. 25, 2013 (JP) ................................ 2013- 266657
Mar. 14, 2014 (JP) ................................ 2014- 051062

(51) Int. Cl.
*A61H 3/04* (2006.01)
*G01C 9/00* (2006.01)
*B62H 1/12* (2006.01)

(52) U.S. Cl.
CPC ......... *A61H 3/04* (2013.01); *A61H 2003/043* (2013.01); *A61H 2003/046* (2013.01);
(Continued)

(58) Field of Classification Search
CPC ...... B62H 1/12; A61H 3/04; A61H 2003/043; A61H 2201/5069; G01C 9/00; G01C 9/06; G01C 9/08; G01C 9/10; B62K 11/007
See application file for complete search history.

(56) References Cited

U.S. PATENT DOCUMENTS 6,062,600 A * 5/2000 Kamen .................... A61G 5/04
280/250.1
6,571,892 B2 * 6/2003 Kamen ................. A61G 5/061
180/21
(Continued)

FOREIGN PATENT DOCUMENTS

DE 102011084236 A1 11/2013
EP 2666453 A1 11/2013
(Continued)

OTHER PUBLICATIONS

Written Opinion for PCT/JP2014/083652 dated Apr. 7, 2015.
International Search report for PCT/JP2014/083652 dated Apr. 7, 2015.

*Primary Examiner* — Anne Marie M Boehler
(74) *Attorney, Agent, or Firm* — Pearne & Gordon LLP

(57) ABSTRACT

A support unit is connected to a shaft of a main wheel and thus is always maintained in parallel to or at a predetermined angle to a road surface, independently of an inclination angle of a main body. Accordingly, an incline estimating unit regards an inclination angle θ3 being a value in an inclination sensor as being equal to an inclination angle θ2 of the road surface (or in a case where the support unit is inclined a predetermined angle to the road surface, an angle from θ3 to the predetermined angle is subtracted from or added to the crossing angle) and outputs the estimated inclination angle θ2 of the road surface to a target inclination angle determining unit.

19 Claims, 11 Drawing Sheets

(52) U.S. Cl.
CPC ................ *A61H 2201/0192* (2013.01); *A61H 2201/5007* (2013.01); *A61H 2201/5028* (2013.01); *A61H 2201/5069* (2013.01); *A61H 2201/5079* (2013.01); *A61H 2201/5084* (2013.01); *A61H 2201/5092* (2013.01)

(56) References Cited

U.S. PATENT DOCUMENTS

| | | | | |
|---|---|---|---|---|
| 7,174,976 | B2 * | 2/2007 | Kamen .................. | A63C 17/01<br>180/19.1 |
| 7,407,187 | B2 * | 8/2008 | Kakinuma ............... | B62H 1/12<br>280/14.21 |
| 7,783,392 | B2 * | 8/2010 | Oikawa .................. | A63C 17/08<br>180/218 |
| 8,423,274 | B2 * | 4/2013 | Doi ...................... | B60N 2/0244<br>180/218 |
| 8,958,976 | B2 * | 2/2015 | Kajima .................. | A61G 5/043<br>701/124 |
| 9,474,678 | B2 * | 10/2016 | Hane ........................ | A61H 3/04 |
| 9,522,611 | B2 * | 12/2016 | Tsuji ....................... | B60L 15/10 |
| 2009/0138232 | A1 * | 5/2009 | Fuwa ..................... | G01B 21/22<br>702/154 |
| 2012/0029696 | A1 * | 2/2012 | Ota .......................... | A61H 3/04<br>700/250 |
| 2013/0274973 | A1 * | 10/2013 | Kamara .................. | B62B 5/026<br>701/22 |
| 2013/0306120 | A1 * | 11/2013 | Fukunaga ................ | A61H 3/04<br>135/66 |

FOREIGN PATENT DOCUMENTS

| | | | |
|---|---|---|---|
| JP | 2013-188304 | A | 9/2013 |
| WO | 2012/114597 | A1 | 8/2012 |

* cited by examiner

HAND-PROPELLED VEHICLE

BACKGROUND

Technical Field

The present disclosure relates to hand-propelled vehicles with wheels and, in particular, to a hand-propelled vehicle that drives and controls wheels.

Previously, there were hand-propelled vehicles that assisted walking by driving and controlling wheels and performing inverted pendulum control (see, for example, Patent Document 1).

The hand-propelled vehicle in Patent Document 1 includes a main body rotatable in a pitch direction, a support unit having a first end connected to the main body, and auxiliary wheels connected to a second end of the support unit. The hand-propelled vehicle can maintain the position of the main body constant by driving and controlling the wheels such that an inclination angle of the main body in the pitch direction is equal to a target inclination angle and such that an angular change is zero.

In the structure in Patent Document 1, in a case where the main body is inclined in a direction opposite the direction of travel, an angle between the main body and the support unit (crossing angle) increases; in a case where the main body is inclined in the direction of travel, the crossing angle decreases. Accordingly, when the crossing angle is detected by an encoder, the inclination angle of the main body in the pitch direction with respect to a normal to a ground road surface can be estimated from the crossing angle.

Patent Document 1: International Publication No. 2012-114597

BRIEF SUMMARY

However, the inverted pendulum control needs to detect the inclination angle of the main body in the pitch direction with respect to a vertical axis. When the road surface is horizontal, because the vertical axis coincides with the normal to the ground road surface, the inclination angle of the main body in the pitch direction with respect to the vertical axis can be calculated by geometrical calculation using the above-described crossing angle between the main body and the support unit. When the road surface is not horizontal, that is, on a hill, it is necessary to detect an inclination angle of the road surface in the pitch direction by an inclination sensor or the like and to make a correction to the calculated inclination angle of the main body in the pitch direction.

In the structure in Patent Document 1, the inclination sensor is required to be mounted on either the main body or the support unit. In both of the case where it is mounted on the main body and the case where it is mounted on the support unit, an output of the inclination sensor changes in response to an angular change in the main body in the pitch direction. Accordingly, it is difficult to sense the inclination angle of the road surface with high accuracy.

The present disclosure provides a hand-propelled vehicle that employs inverted pendulum control and is capable of detecting an inclination angle of a road surface easily and with high accuracy.

A hand-propelled vehicle according to the present disclosure includes a main body, a plurality of main wheels being rotatable and supported by the main body, a support unit coupled to a rotating shaft of each of the plurality of main wheels and being rotatable in a pitch direction (a rotational direction about an axis parallel to the rotational axis of the rotating shaft of each of the plurality of main wheels), one or more auxiliary wheels coupled to the support unit, a drive unit (e.g., a circuit) configured to drive a motor for rotating the plurality of main wheels, a control unit (e.g., CPU) configured to control the drive unit, a crossing-angle detecting unit configured to detect an angle between the main body and the support unit, and a road-surface inclination angle detecting unit mounted on the support unit and configured to detect an inclination angle of a road surface in the pitch direction.

The control unit is configured to calculate an inclination angle of the main body in the pitch direction with respect to a vertical axis on the basis of an output of the crossing-angle detecting unit and an output of the road-surface inclination angle detecting unit and to control the drive unit such that the inclination angle of the main body in the pitch direction with respect to the vertical axis is equal to a target inclination angle of the main body in the pitch direction.

Because the support unit is coupled to the rotating shaft of the main wheel in the hand-propelled vehicle in the present disclosure, in a case where the main body rotates in the pitch direction, the angle between the road surface and the support unit is maintained in parallel or at a predetermined angle. Accordingly, detecting the inclination of the support unit with respect to a horizontal direction by the inclination angle detecting unit enables directly detecting the inclination angle of the road surface. Thus, the inclination angle of the road surface can be detected easily and with high accuracy, irrespective of the inclination angle of the main body.

The inclination angle detecting unit may include a sensor capable of detecting the inclination angle of the road surface and may include, for example, at least one or more of an inclination angle sensor, a single-axis acceleration sensor, and a multi-axis acceleration sensor.

The crossing-angle detecting unit may include a sensor capable of detecting the angle between the main body and the support unit and may include, for example, at least one or more of a rotary encoder and a potentiometer. By the use of the sensor(s), the inclination angle of the main body in the pitch direction with respect to the support unit can be directly detected.

The inclination angle of the main body in the pitch direction with respect to the vertical axis can be calculated easily and with high accuracy on the basis of the inclination angle of the road surface in the pitch direction and the inclination angle of the main body in the pitch direction with respect to the support unit obtained by the above-described way.

The target inclination angle of the main body in the pitch direction may be a predetermined angle with respect to the vertical axis or may be set by the control unit on the basis of the output of the road-surface inclination angle detecting unit. The control unit may control the drive unit such that the inclination angle of the main body in the pitch direction with respect to the vertical axis is equal to the target inclination angle, that is, such that the difference between both the inclination angles is zero.

The main body may include an inclination angular velocity detecting unit configured to detect an inclination angular velocity of the main body in the pitch direction, and the drive unit may be controlled such that the inclination angular velocity is zero.

The inclination angular velocity detecting unit may be capable of detecting the inclination angular velocity of the main body in the pitch direction, and one example method may use a differential value of an output of a gyro sensor or the crossing-angle detecting unit.

A form may be used in which the control unit is configured to set a dead zone (for example, on the order of ±5°) where a change in the output of the inclination angle detecting unit is not used in setting the target inclination angle again with reference to an output value (for example, 0°) of the crossing-angle detecting unit in a case where the hand-propelled vehicle is on a flat surface and to set the target inclination angle again and set a new dead zone again with reference to an output value of the inclination angle detecting unit at the point in time when the dead zone is exceeded in a case where the output of the inclination angle detecting unit exceeds the dead zone.

In this manner, in a case where the output of the inclination angle detecting unit exceeds the dead zone, the target inclination angle is set again, and thus a torque to be applied to the plurality of main wheels by the drive unit is changed and an assisting force is adjusted.

If the dead zone is not set again, in a case where the inclination angle of the road surface is a value near the border of the dead zone (for example, 5°) or the inclination sensor incorrectly detects acceleration as a change in the inclination angle during acceleration or deceleration, adjustment of the assisting force would be frequently repeated. To address this issue, the control unit sets a new dead zone again with reference to an output value of the inclination sensor at the point in time when the dead zone is exceeded (for example, sets a new dead zone at 0° to 10° with reference to 5°) and thus can stabilize the behavior of adjustment of the assisting force.

In the adjustment of the assisting force, for example, a force for advancing a user is obtainable by setting the target inclination angle again such that the main body is inclined forward of the vertical direction, and a force for pushing the user backward is obtainable by setting the target inclination angle again such that the main body is inclined backward of the vertical direction.

A form may be used in which the hand-propelled vehicle is further include acceleration detecting means for detecting acceleration of the main body in the pitch direction, and the control unit is configured to change the dead zone in accordance with the acceleration detected by the acceleration detecting means. The acceleration in the pitch direction can be detected by, for example, a rotary encoder that detects a rotation angle of the main wheel. This can prevent incorrectly sensing the inclination angle of the road surface from occurring in a case where the hand-propelled vehicle accelerates or decelerates. In a case where the degree of acceleration or deceleration is small, an inclination angle near a real inclination angle of the road surface is detectable without necessarily setting an unnecessarily large dead zone.

According to the present disclosure, the hand-propelled vehicle being capable of detecting the inclination angle of the road surface easily and with high accuracy and employing inverted pendulum control can be achieved.

DETAILED DESCRIPTION

First Embodiment

Figure 1:
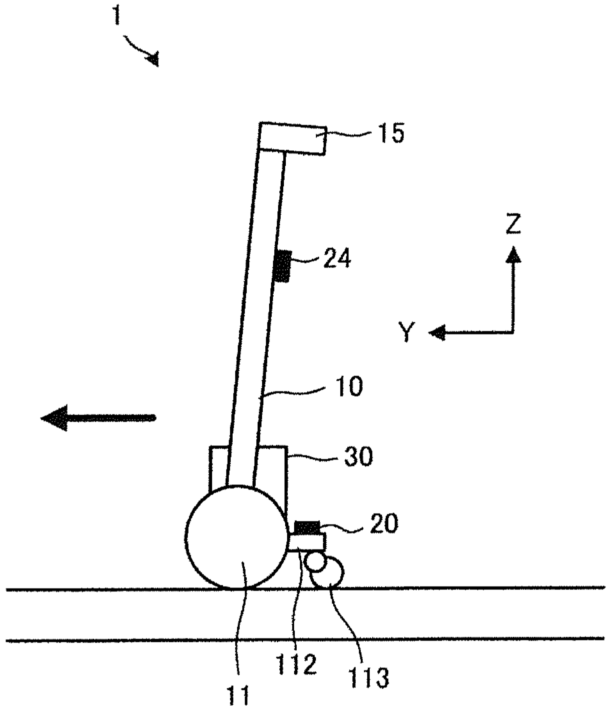
FIG. 1 is a side view of a hand-propelled vehicle.
Figure 2A:
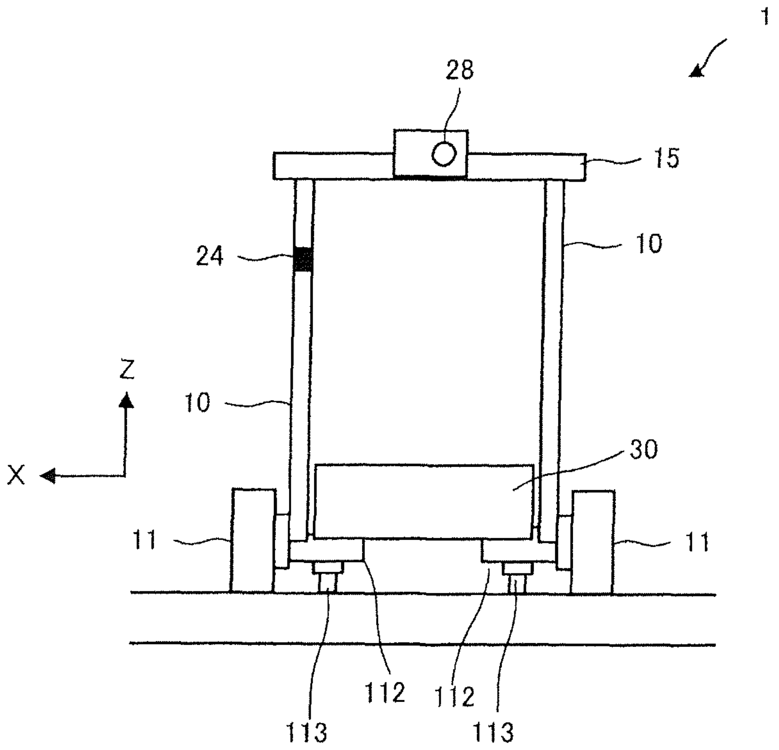
FIG. 2A is a front view of the hand-propelled vehicle.
Figure 2B:
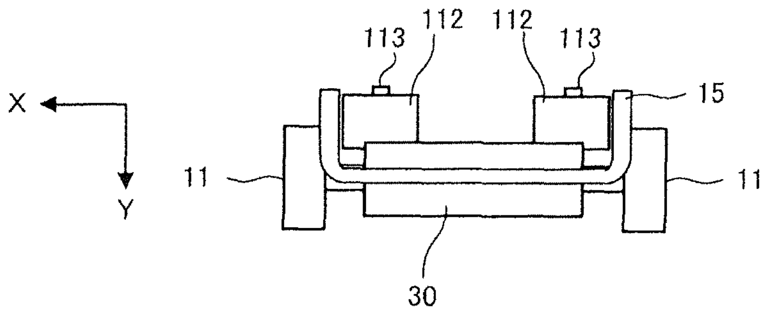
FIG. 2B is a top view of the hand-propelled vehicle.
Figure 3:
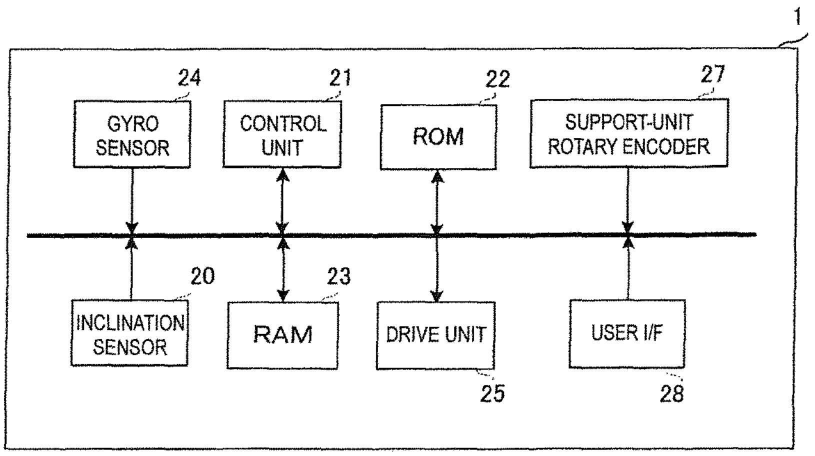
FIG. 3 is a block diagram that illustrates a configuration of the hand-propelled vehicle.

FIG. 1 is a left side view of a hand-propelled vehicle 1 according to a first embodiment of the present disclosure, FIG. 2A is a front view, and FIG. 2B is a plan view. FIG. 3 is a block diagram that illustrates a hardware configuration of the hand-propelled vehicle 1.

The hand-propelled vehicle 1 includes a main body 10 having a shape that is long in a vertical direction (Z direction in the drawings) and short in a depth direction (Y direction in the drawings) and side-to-side direction (X direction in the drawings). A pair of main wheels 11 are mounted on ends in the side-to-side direction in a lower portion of the main body 10 in the downward vertical direction. This embodiment illustrates an example in which the number of main wheels 11 is two. The number of main wheels 11 may be one or three or more.

The main body 10 has a shape of two bars coupled to the main wheels 11, the two bars are connected together with a cylindrical grip unit 15 disposed therebetween in an upper portion, and the main body 10 is rotatable in a pitch direction about shafts of the main wheels 11. The main body 10 may not have the shape of two bars in this example. The main body 10 may be a single bar member or may be a thin board member. A box 30 incorporating a substrate for control, a cell battery, and the like is disposed in the vicinity of the lower portion of the main body 10. In actuality, a cover is attached to the main body 10, and the internal substrate and the like are not seen in external appearance.

The grip unit 15 has a cylindrical shape that is long in the side-to-side direction, is bent toward an opposite direction to the direction of travel (backward) in the vicinity of the left and right ends, and extends backward. This enables a location where a user grips the grip unit 15 to be shifted backward and can lead to a widen space around the feet of the user.

Each of the rotating shafts of the main wheels 11 is coupled to a support unit 112 having a thin board shape extending backward. The support unit 112 is connected to the rotating shaft of the main wheel 11 and being rotatable in the pitch direction such that it extends in parallel to the road surface. The support unit 112 may not be parallel to the road surface. The support unit 112 may be connected to the rotating shaft of the main wheel 11 and being rotatable such that the angle to the road surface is always maintained at a predetermined angle.

Figure 4:
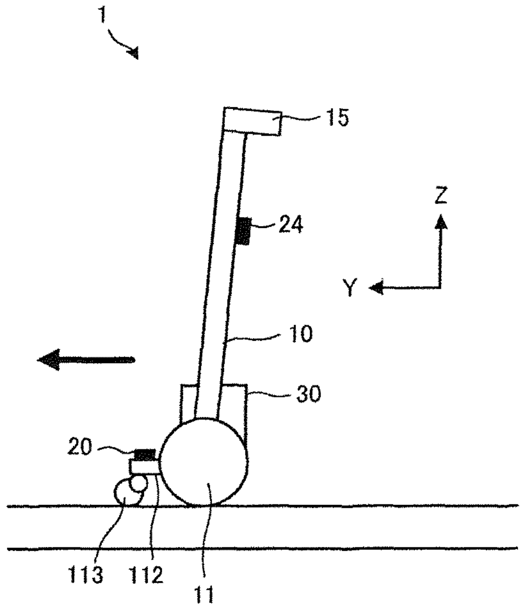
FIG. 4 is a side view of the hand-propelled vehicle in a case where a support unit extends forward of a main wheel with respect to a direction of travel.

The support unit 112 is coupled to an auxiliary wheel 113 on a lower surface in a direction opposite the side where the support unit 112 is coupled to the rotating shaft of the main wheel 11. Both the main wheel 11 and the auxiliary wheel 113 are in contact with the road surface. As illustrated in the side view in FIG. 4, a form may be used in which the support unit 112 extends forward of the main wheel 11 with respect to the direction of travel. In this form, in which the support unit 112 extends forward of the main wheel 11, the space around the feet of the user can be large. In a form in which the support unit 112 extends backward of the main wheel 11, the main wheel 11, which has a larger inside diameter, is arranged forward with respect to the direction of travel, and thus the hand-propelled vehicle 1 can get over a step easily.

FIGS. 1, 2A, 2B, and 4 illustrate a state in which the auxiliary wheels 113 are in contact with the road surface. Even in a state where only the main wheels 11 are in contact with the road surface, the hand-propelled vehicle 1 can stand on its own by inverted pendulum control.

A motor may be mounted on a portion where the rotating shaft of the main wheel 11 and the support unit 112 are connected, a crossing angle being the angle between the rotating shaft of the main wheel 11 and the support unit 112 may be actively controlled by driving the motor.

In this example, the two support units 112 and two auxiliary wheels 113, one support unit 112 and auxiliary wheel 113 are coupled to the rotating shaft of the left auxiliary wheel 113 and the others are coupled to that of the right main wheel 11. A form may be used in which one or three or more support units 112 and auxiliary wheels 113 are disposed. By coupling them to the rotating shafts of the left and right main wheels 11, as illustrated in FIGS. 2A and 2B, the space around the feet of the user can be large.

A user interface (I/F) 28, such as a power switch, is disposed on the grip unit 15. The user can push the hand-propelled vehicle 1 in the direction of travel by gripping the grip unit 15. The user can also push the hand-propelled vehicle 1 in the direction of travel while placing their forearm or the like on the grip unit 15 by friction produced between the grip unit 15 and their forearm or the like when pressing the forearm or the like against the grip unit 15 from above without necessarily gripping the grip unit 15.

Next, a hardware configuration and operations of the hand-propelled vehicle 1 are described. As illustrated in FIG. 3, the hand-propelled vehicle 1 includes an inclination sensor 20, a control unit 21, a read-only memory (ROM) 22, a random-access memory (RAM) 23, a gyro sensor 24, a drive unit 25, a support-unit rotary encoder 27, and the user I/F 28.

The control unit 21 is a function unit that controls the hand-propelled vehicle 1 in a collective manner and achieves various operations by reading a program stored in the ROM 22 and developing the program in the RAM 23.

Figure 5A:
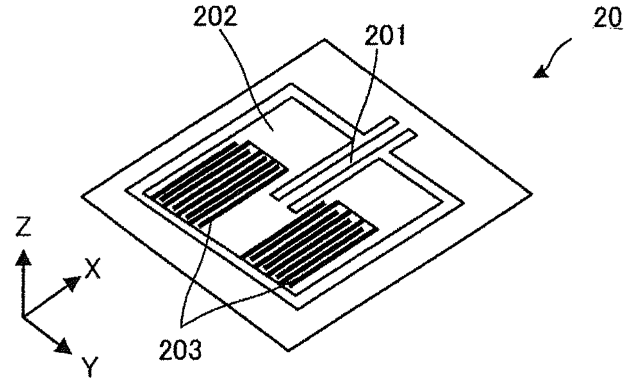
FIGS. 5A and 5B include illustrations of a configuration of an inclination sensor.
Figure 5B:
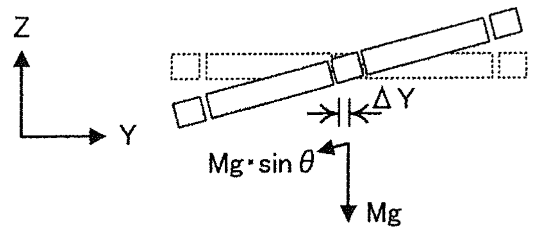

The inclination sensor 20 corresponds to a road-surface inclination angle detecting unit in the present disclosure, is mounted on the support unit, which is maintained in parallel to or at a constant angle to the road surface, detects the inclination angle of the road surface, and outputs it to the control unit 21. Specifically, the inclination sensor 20 is formed by processing a thin plate-like silicon wafer, as illustrated in FIG. 5A, and includes a spring 201, a movable portion 202, and a comb electrode portion 203. As illustrated in FIG. 5B, when an inclination angle θ is input around the X-axis of the horizontally placed inclination sensor 20, a force of Mg·sin θ is exerted on the movable portion 202, which has a mass of M. This displaces the spring 201 by ΔY in the Y direction. The inclination sensor 20 detects the displacement ΔY as a change in the electrostatic capacity at the comb electrode portion 203. The inclination sensor 20 outputs the change in the electrostatic capacity as the inclination angle to the control unit 21. As a substitute for the inclination sensor 20, a single-axis acceleration sensor or multi-axis acceleration sensor may be used.

The support-unit rotary encoder 27 corresponds to a crossing-angle detecting unit in the present disclosure, detects the crossing angle, which is the angle between the main body 10 and the support unit 112, and outputs the result of detection to the control unit 21. The crossing angle may be detected by a potentiometer, not only the rotary encoder.

The gyro sensor 24 corresponds to an inclination angular velocity detecting unit in the present disclosure, detects the inclination angular velocity of the main body 10 in the pitch direction, and outputs it to the control unit 21.

The hand-propelled vehicle 1 may further include an acceleration sensor that detects an acceleration of the main body 10 in each of directions, a rotary encoder that detects a rotation angle of the main wheel 11, a rotary encoder that detects a rotation angle of the auxiliary wheel 113, and the like.

Figure 6:
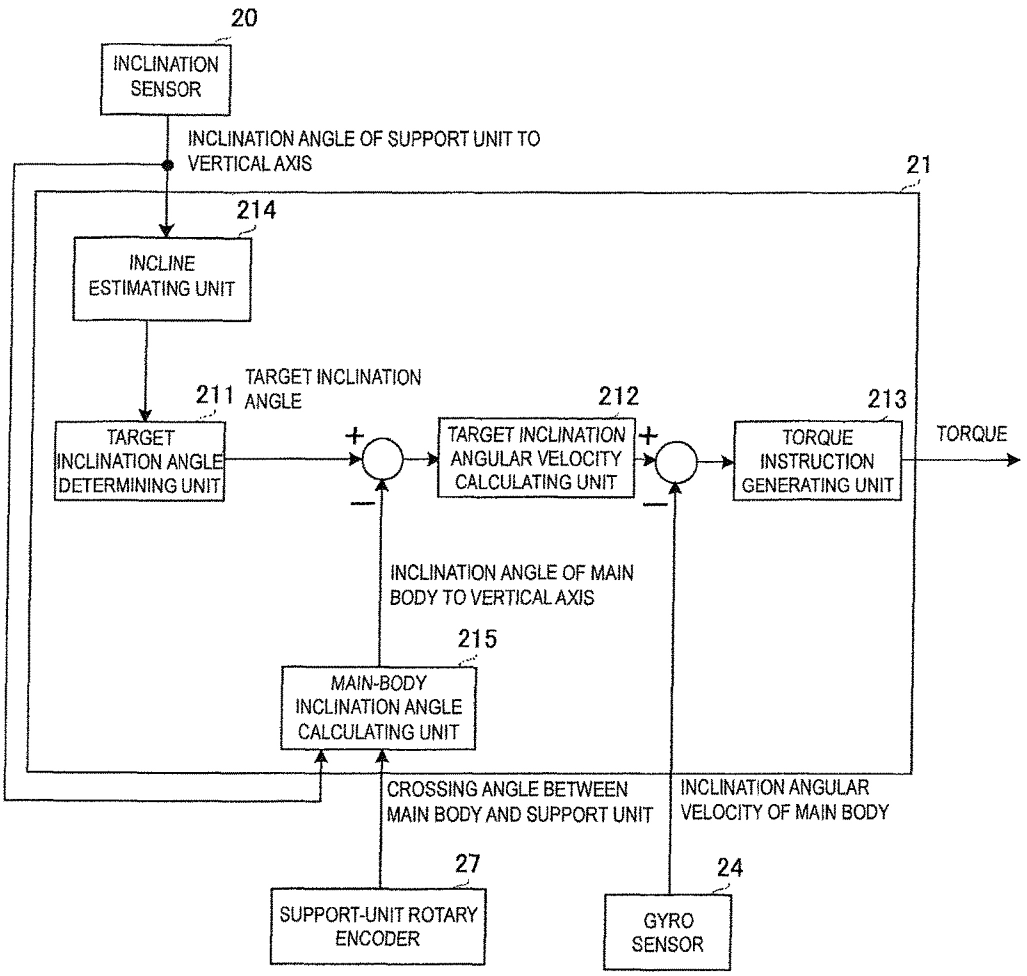
FIG. 6 is a control configuration diagram that illustrates a configuration of a control unit.

FIG. 6 is a control configuration diagram of the control unit 21. The control unit 21 includes a target inclination angle determining unit 211, a target inclination angular velocity calculating unit 212, a torque instruction generating unit 213, an incline estimating unit 214, and a main-body inclination angle calculating unit 215.

Figure 7A:
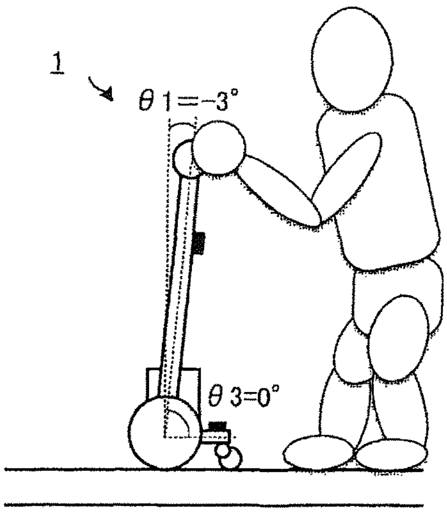
FIGS. 7A-7C include illustrations of a relationship between an inclination angle of a road surface and a target inclination angle.

The target inclination angle determining unit 211 sets a target inclination angle θ1 being a target for the inclination angle of the main body 10 in the pitch direction with respect to the vertical axis. For example, as illustrated in FIG. 7A, as the target inclination angle θ1, a first angle (θ1=−3°) being an angle slightly backward from 0 degree, which is the vertical axis, is output.

The target inclination angular velocity calculating unit 212 receives a difference value between the first angle and the inclination angle of the main body 10 with respect to the vertical axis at present and calculate an inclination angular velocity of the main body 10 at which the difference value is zero.

Figure 8:
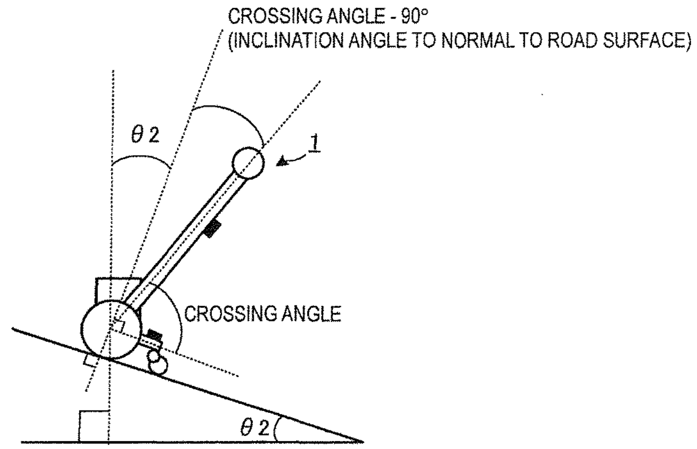
FIG. 8 illustrates an inclination angle of a main body with respect to a vertical axis.

The inclination angle of the main body 10 with respect to the vertical axis at present is calculated by the main-body inclination angle calculating unit 215. The main-body inclination angle calculating unit 215 calculates the inclination angle of the main body 10 with respect to the vertical axis by using the crossing angle between the main body 10 and the support unit 112 input from the support-unit rotary encoder 27 and the inclination angle of the support unit 112 with respect to the vertical axis input from the inclination sensor 20. The support unit 112 is connected to the shaft of the main wheel 11 such that it is parallel to a horizontal road surface. Accordingly, as illustrated in FIG. 8, the main-body inclination angle calculating unit 215 calculates the inclination angle of the main body 10 with respect to the normal to the road surface at present such that in a case where the crossing angle is 90 degrees, the inclination angle of the main body 10 with respect to the normal to the road surface is determined to be 0 degree, such that in a case where the crossing angle increases, the main body 10 is determined to be inclined forward with respect to the direction of travel, and such that in a case where the crossing angle decreases, the main body 10 is determined to be inclined backward with respect to the direction of travel. For example, "crossing angle −90°" is calculated as the inclination angle with respect to the normal to the road surface such that in a case where the main body 10 is inclined forward with respect to the direction of travel, the inclination angle with respect to the normal to the road surface is a positive value and such that in a case where the main body 10 is inclined backward with respect to the direction of travel, it is a negative value.

Then, the main-body inclination angle calculating unit 215 adds an inclination angle θ2 of the support unit 112 with respect to the vertical axis input from the inclination sensor 20 and calculates the inclination angle of the main body 10 with respect to the vertical axis. That is, "crossing angle −90°+θ2" is calculated as the inclination angle of the main body 10 with respect to the vertical axis. For example, in a case where the road surface slopes upward (θ2=−15°) and the main body 10 is inclined backward with respect to the direction of travel (crossing angle is 75°), the inclination angle of the main body 10 with respect to the vertical axis is calculated at 75°−90°−15°=−30°.

The support unit 112 and the road surface may not be parallel to each other. It is merely necessary that the support unit 112 is connected to the shaft of the main wheel 11 such that the support unit 112 and the road surface form a predetermined angle (known angle). In this case, the inclination angle of the main body 10 with respect to the vertical axis can be calculated by subtracting the predetermined angle from the crossing angle or adding the predetermined angle to the crossing angle.

Aside from the above-described method of detecting it by using the support-unit rotary encoder 27, a method of integrating values output from the gyro sensor 24 may also be used in obtaining the inclination angle of the main body 10 with respect to the vertical axis. In a case where the inclination sensor 20 is mounted on the main body 10, the inclination angle can be obtained from the inclination sensor 20 mounted on the main body 10.

The torque instruction generating unit 213 receives a difference value between the target inclination angular velocity calculated by the target inclination angular velocity calculating unit 212 and the inclination angular velocity of the main body 10 at present input from the gyro sensor 24 and calculates a torque to be applied such that the difference value is zero. The inclination angular velocity of the main body 10 can also be obtained by differentiating the inclination angle of the main body 10 estimated from the crossing angle.

A control signal based on the torque to be applied calculated in this way is input to the drive unit 25. The drive unit 25 is a function unit that drives the motor for driving the shaft mounted on the main wheel 11 and provides the main wheel 11 with power. The drive unit 25 drives the motor for the main wheel 11 on the basis of the input control signal and rotates the main wheel 11.

In this way, the hand-propelled vehicle 1 performs inverted pendulum control such that the position of the main body 10 is maintained constant. If the user pushes the hand-propelled vehicle 1 forward with respect to the direction of travel, because the inclination angle of the main body 10 is inclined forward with respect to the target inclination angle, a torque for driving the main wheel 11 in the forward direction is exerted in order to maintain the inclination angle of the main body 10 at the target inclination angle. This causes the hand-propelled vehicle 1 to move so as to follow movement of the user.

Figure 7B:
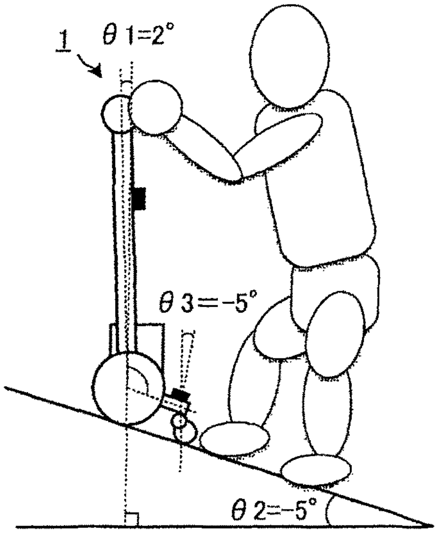
Figure 7C:
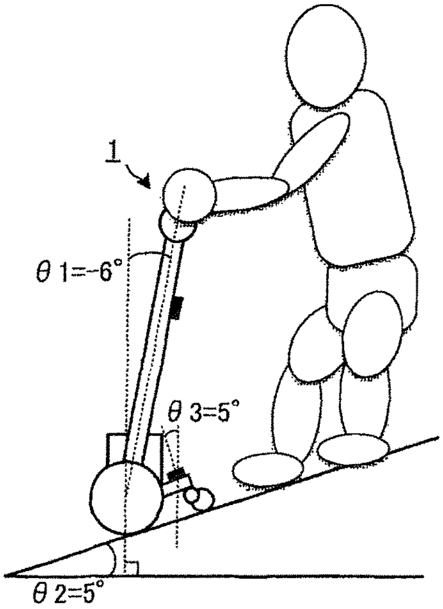

The incline estimating unit 214 receives a value in the inclination sensor 20 and calculates the inclination angle of the road surface. As illustrated in FIGS. 7A, 7B, and 7C, because the support unit 112 is connected to the shaft of the main wheel 11, the support unit 112 is always maintained in parallel to or at a predetermined angle to the road surface for any inclination angle of the main body 10. Accordingly, the incline estimating unit 214 regards an inclination angle θ3 being the value in the inclination sensor 20 as being the same as the inclination angle θ2 of the road surface (or in a case where the support unit 112 is inclined a predetermined angle to the road surface, an angle from θ3 to the predetermined angle is subtracted from or added to the crossing angle) and outputs the estimated inclination angle θ2 of the road surface to the target inclination angle determining unit 211.

The target inclination angle determining unit 211 sets the target inclination angle θ1 again in accordance with the input inclination angle θ2 of the road surface. For example, as illustrated in FIG. 7B, in a case where the inclination angle θ2 is a negative value (for example, −5°) and the road surface slopes upward, the target inclination angle θ1 is set again at a second angle (for example, θ1=2°) being an angle at which the main body 10 is inclined further forward than that at the first angle. In a case where the inclination angle of the main body 10 with respect to the normal to the road surface is a reference (0 degree), the target inclination angle determining unit 211 outputs a value (θ1=7°) in which the input inclination angle (θ2=−5°) is subtracted such that the main body 10 is inclined 2° forward with respect to the vertical direction, as the target inclination angle.

This causes the main body 10 to be inclined forward, as illustrated in FIG. 7B, and a higher torque for rotating the main wheel 11 in the forward direction is exerted. Accordingly, a force for advancing the user can be obtained, and this enables the user to ascend the hill more comfortably.

As illustrated in FIG. 7C, in a case where the inclination angle θ2 is a positive value (for example, 5°) and the road surface slopes downward, the target inclination angle θ1 is set again at a third angle (for example, θ1=−6°) being an angle at which the main body 10 is inclined further backward than that at the first angle. In a case where the inclination angle of the main body 10 with respect to the normal to the road surface is a reference, the target inclination angle determining unit 211 outputs a value (θ1=−11°) in which the input inclination angle (θ2=5°) is subtracted such that the main body 10 is inclined 6° backward with respect to the vertical direction, as the target inclination angle.

This causes the main body 10 to be inclined further backward, as illustrated in FIG. 7C, and a torque for rotating the main wheel 11 backward is exerted. Accordingly, a braking effect is exerted, a force for pushing the user backward is obtainable, and this enables the user to descend the hill more safely.

Figure 9:
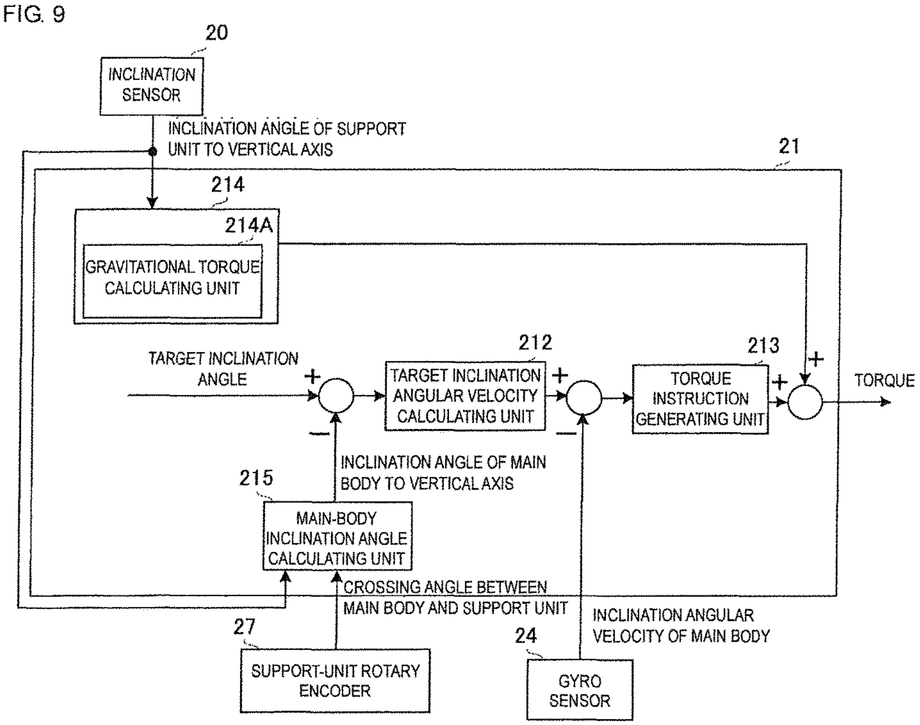
FIG. 9 is a control configuration diagram that illustrates a configuration of the control unit.
Figure 10:
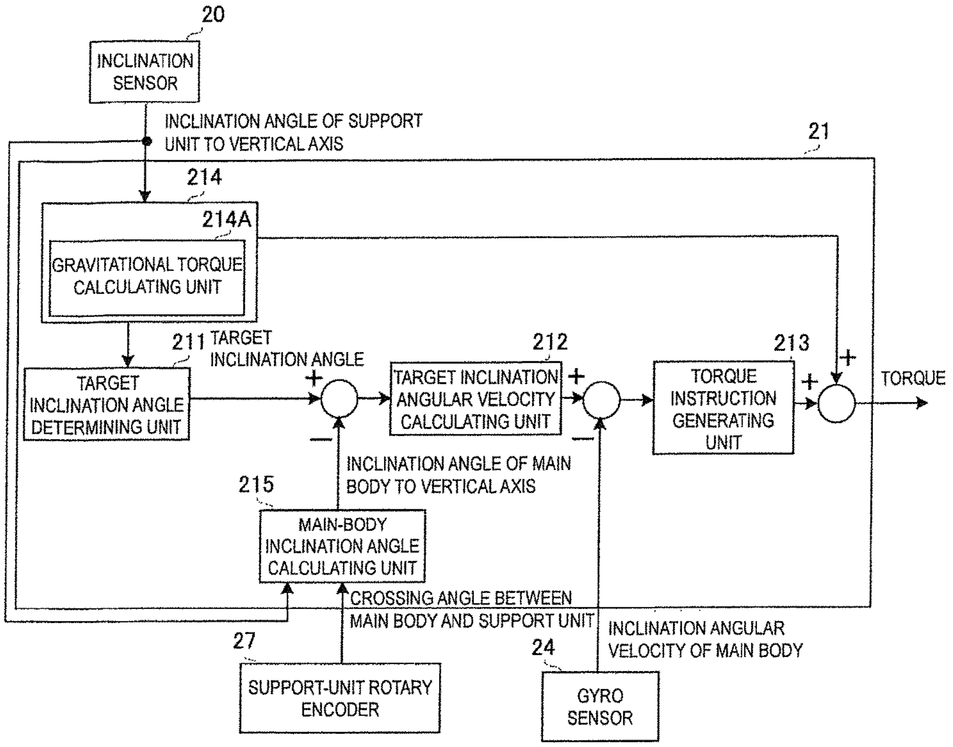
FIG. 10 is a control configuration diagram that illustrates a configuration of the control unit.

Approaches to adjusting an assisting force are not limited to changing the target inclination angle and may include adding an offset torque, as illustrated in FIG. 9, for example. In this case, the incline estimating unit 214 calculates an offset torque for compensating for a gravitational torque generated depending on the inclination angle of the road surface in accordance with the inclination angle of the road surface estimated on the basis of the value in the inclination sensor 20, by using a gravitational torque calculating unit 214A. The offset torque is added to the torque calculated by the torque instruction generating unit 213, and the torque is applied to the drive unit 25. As illustrated in FIG. 10, in addition to changing the target inclination angle, the offset torque may be applied.

Second Embodiment

Next, a hand-propelled vehicle according to a second embodiment is described. The hand-propelled vehicle according to the second embodiment differs from that according to the first embodiment in that the incline estimating unit 214 further determines whether a value input from the inclination sensor 20 is within a predetermined range (dead zone). The configuration and functions of the hand-propelled vehicle are the same as those in the first embodiment, and illustrations and description thereof are omitted.

In the inclination sensor illustrated in FIGS. 5A and 5B, an electrostatic capacity in the comb electrode portion is also changed in response to an acceleration in the direction of travel (Y direction). This may lead to incorrectly detecting an increase or decrease in speed as a change in the inclination angle of the road surface. In this case, the assisting force may be adjusted even when the inclination angle of the road surface is not changed in reality, and behavior of adjustment of the assisting force may be unstable. To address this issue, the hand-propelled vehicle according to the second embodiment aims to stabilize the behavior of adjustment of the assisting force in a case where the assisting force is adjusted in accordance with the inclination angle, and it determines whether a value input from the inclination sensor 20 is within a predetermined range (dead zone).

When the incline estimating unit 214 determines that the value in the inclination sensor 20 exceeds the dead zone, it informs the target inclination angle determining unit 211 of the value in the inclination sensor 20 and that it exceeds the dead zone. When the target inclination angle determining unit 211 receives the information that the dead zone is exceeded, it sets the target inclination angle θ1 again. The target inclination angle determining unit 211 may set the target inclination angle again instantly at the point when the dead zone is exceeded, even for a moment, or may set the target inclination angle again after a predetermined elapsed time during which the dead zone is exceeded. Additionally, in a case where soon after the target inclination angle determining unit 211 sets the target inclination angle again, it becomes necessary to set it again, the control unit 21 may determine that the hand-propelled vehicle may be running on a rough road, an operator may have stumble, or the like and thus may perform control for stopping the hand-propelled vehicle 1.

Figure 11:
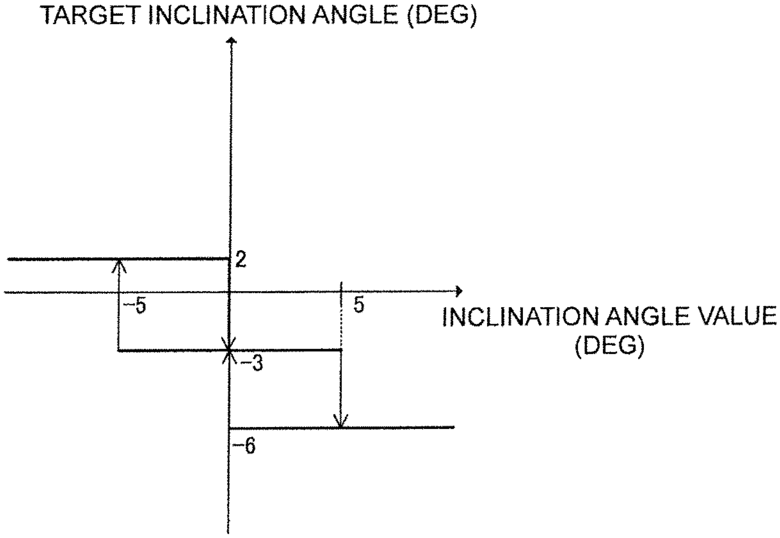
FIG. 11 illustrates a relationship between a dead zone and the target inclination angle.
Figure 13A:
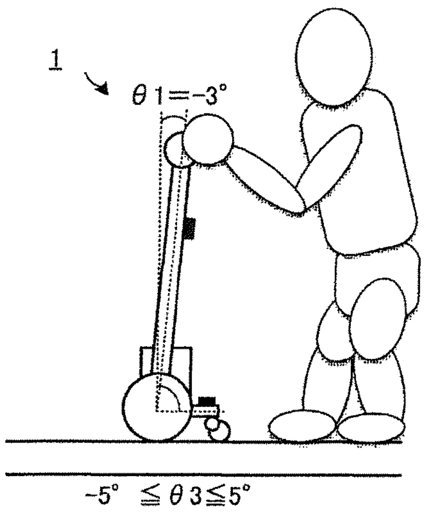
FIGS. 13A-13C include illustrations of a relationship between the inclination angle of the road surface and the target inclination angle.

FIG. 11 illustrates a relationship between the dead zone and the target inclination angle. The horizontal axis in the graph illustrated in FIG. 11 indicates a value in the inclination sensor 20, and the vertical axis indicates a target inclination angle. In an initial state (flat surface), the dead zone is set at ±5° with reference to the value 0° in the inclination sensor. That is, as illustrated in FIG. 13A, when the inclination angle θ3, which is a value in the inclination sensor 20, is in the range of −5° to 5°, the target inclination angle θ1 is fixed at the first angle (θ1=−3°) and a change in the output of the inclination sensor is not used in controlling the drive unit 25.

The hand-propelled vehicle 1 may include a rotary encoder that detects the rotation angle of the main wheel 11 or a rotary encoder that detect the rotation angle of the auxiliary wheel 113. In a case where the rotary encoder senses that an absolute value of an acceleration of the hand-propelled vehicle 1 (main body 10) in the pitch direction is at or above a set value, a threshold value range in the dead zone may be extended. In contrast, in a case where it senses that the absolute value of the acceleration of the hand-propelled vehicle 1 (main body 10) in the pitch direction falls below the set value, the threshold value range in the dead zone may be narrowed. The threshold value range in the dead zone may be set such that it is proportional to the magnitude of the acceleration of the hand-propelled vehicle 1 (main body 10) in the pitch direction. Thus, in a case where the hand-propelled vehicle 1 accelerates or decelerates, the inclination angle of the road surface can be prevented from being incorrectly sensed. In a case where the degree of acceleration or deceleration is small, an inclination angle near a real inclination angle of the road surface can be detected without necessarily setting an unnecessary large dead zone.

Figure 12:
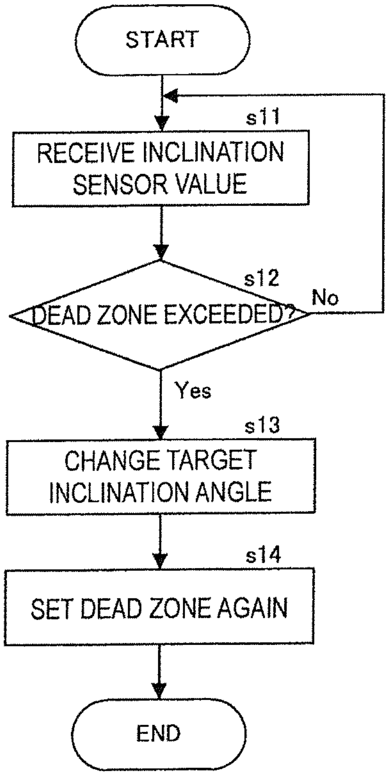
FIG. 12 is a flowchart that illustrates operations of the control unit.

FIG. 12 is a flowchart that illustrates operations of the control unit 21. As illustrated in FIG. 12, the incline estimating unit 214 receives a value in the inclination sensor 20 (s11) and determines whether the value in the inclination sensor 20 is within a predetermined range (dead zone) (s12). In a case where the incline estimating unit determines that the value in the inclination sensor 20 exceeds the dead zone (Yes at s12), the target inclination angle determining unit 211 sets the target inclination angle θ1 again (s13).

Figure 13B:
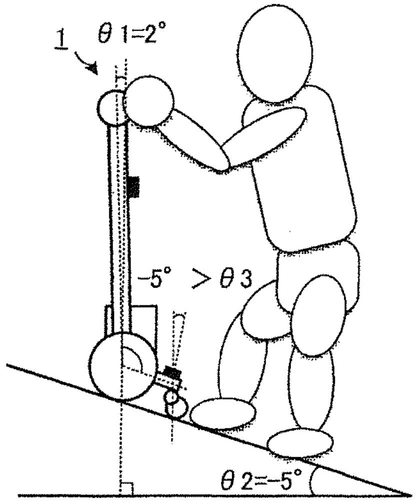

For example, as illustrated in FIG. 13B, in a case where the inclination angle θ3, which is the value in the inclination sensor 20, falls below −5°, the target inclination angle determining unit 211 sets the target inclination angle θ1 again at the second angle (for example, θ1=2°) being an angle at which the main body 10 is inclined further forward than that at the first angle. In the case where the normal to the road surface is a reference (0°), as described above, the target inclination angle determining unit 211 outputs a value (θ1=7°) in which the value −5° in the inclination sensor 20 at the point in time when the dead zone is exceeded is subtracted such that the main body 10 is inclined 2° forward with respect to the vertical direction, as the target inclination angle.

This causes the main body 10 to be inclined forward, as illustrated in FIG. 13B, and thus a higher torque for rotating the main wheel 11 in the forward direction is exerted. Accordingly, a force for advancing the user can be obtained, and this enables the user to ascend the hill more comfortably.

Figure 13C:
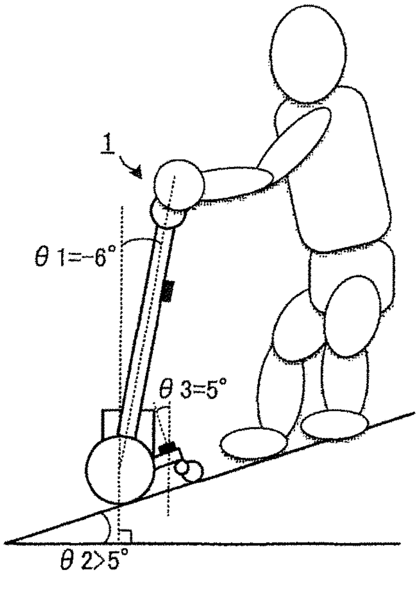

As illustrated in FIG. 13C, in a case where the value θ3 in the inclination sensor 20 exceeds 5°, the target inclination angle determining unit 211 outputs the third angle (for example, θ1=−6°) being an angle at which the main body 10 is inclined further backward than that at the first angle, as the target inclination angle θ1. In a case where the normal to the road surface is a reference (0 degree), the target inclination angle determining unit 211 outputs a value (θ1=−11°) in which the value −5° in the inclination sensor 20 at the point in time when the dead zone is exceeded is subtracted such that the main body 10 is inclined 6° backward with respect to the vertical direction, as the target inclination angle.

This causes the main body 10 to be inclined further backward, as illustrated in FIG. 13C, and a torque for rotating the main wheel 11 backward is exerted. Accordingly, a braking effect is exerted, a force for pushing the user backward is obtainable, and this enables the user to descend the hill safely.

When the assisting force is adjusted in this way, the incline estimating unit 214 sets a new dead zone again (s14). For example, as illustrated in FIG. 9, in a case where the value in the inclination sensor 20 falls below −5°, a new dead zone of ±5° is set with reference to the value −5° in the inclination sensor 20 at the point in time when the dead zone is exceeded. Because this example is a form in which in a case where the value in the inclination sensor 20 further decreases, the assisting force is not adjusted, the dead zone is −∞ to 0°. Thus, the target inclination angle θ1 is fixed at the second angle (θ1=2°) while the value in the inclination sensor 20 is at or below 0°. In a case where the value in the inclination sensor 20 exceeds 0°, the target inclination angle θ1 is set again at the first angle and a dead zone of ±5° is set again with reference to 0°.

In a case where the value in the inclination sensor 20 exceeds 5°, the incline estimating unit 214 sets a new dead zone of ±5° with reference to the value 5° in the inclination sensor 20 at the point in time when the dead zone is exceeded. Because this example is a form in which in a case where the value in the inclination sensor 20 further increases, the assisting force is not adjusted, the dead zone is 0° to ∞. Thus, while the value in the inclination sensor 20 is at or above 0°, the target inclination angle θ1 is fixed at the third angle (θ1=−6°). In a case where the value in the inclination sensor 20 falls below 0°, the target inclination angle θ1 is set again at the first angle and a dead zone of ±5° is set again with reference to 0°.

Thus, even when a real inclination angle of the road surface is a value near the border of the dead zone (for example, 5° or −5°) or even when an increase or decrease in speed during acceleration or deceleration is incorrectly detected as a change in the inclination angle of the road surface of the inclination sensor 20, adjustment of the assisting force is not frequently repeated, and behavior of adjustment of the assisting force can be stabilized.

Figure 14A:
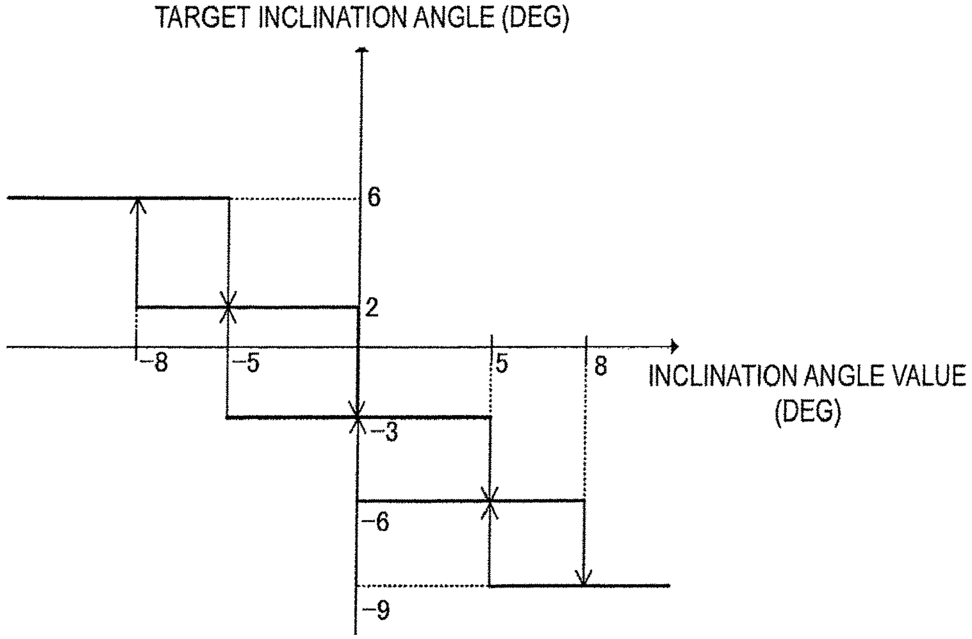
FIGS. 14A and 14B include illustrations of a relationship between the dead zone and the target inclination angle according to a first variation and a second variation.

Next, FIG. 14A illustrates a relationship between the dead zone and the target inclination angle in a first variation. In the first variation, in a case where after the value in the inclination sensor 20 decreases and the assisting force is strongly adjusted, the value in the inclination sensor 20 further decreases or in a case where after the value in the inclination sensor 20 increases and the assisting force is weakly adjusted (or an assisting force in the opposite direction is set), the value in the inclination sensor 20 further increases, a new target inclination angle and dead zone are set again.

In the first variation, in a case where the value in the inclination sensor 20 falls below −5°, the incline estimating unit 214 sets a new dead zone between −8° and 0° with reference to the value −5° in the inclination sensor 20 at the point in time when the dead zone is exceeded.

Then, in a case where the value in the inclination sensor 20 falls below −8°, the target inclination angle determining unit 211 sets the target inclination angle θ1 at a fourth angle (for example, θ1=6°) being an angle at which the main body 10 is inclined further forward than that at the second angle. In a case where the normal to the road surface is a reference (0°), the target inclination angle determining unit 211 outputs a value (θ1=14°) in which the value −8° in the inclination sensor 20 at the point in time when the dead zone is exceeded is subtracted such that the main body 10 is inclined 6° forward with respect to the vertical direction in consideration of an upward hill.

Because this causes the main body 10 to be inclined further forward, a higher torque for rotating the main wheel 11 in the forward direction is exerted and the assisting force is further strongly adjusted. The incline estimating unit 214 sets a new dead zone with reference to the value −8° in the inclination sensor 20 at the point in time when the dead zone is exceeded. In this example, the new dead zone is −∞ to −5°. This causes the target inclination angle θ1 to be set again at the fourth angle in a case where the value in the inclination sensor 20 falls below −8° and be fixed at the fourth angle until it exceeds −5° again. In a case where the value in the inclination sensor 20 exceeds −5°, the target inclination angle θ1 is set again at the second angle and a new dead zone of −8° to 0° is set again.

In contrast, in a case where the value in the inclination sensor 20 exceeds 5°, the incline estimating unit 214 sets a new dead zone between 0° and 8° with reference to the value 5° in the inclination sensor 20 at the point in time when the dead zone is exceeded.

In a case where the value in the inclination sensor 20 exceeds 8°, the target inclination angle determining unit 211 sets a fifth angle (for example, θ1=−9°) being an angle at which the main body 10 is inclined further backward than that at the third angle, as the target inclination angle θ1. In a case where the normal to the road surface is a reference (0°), the target inclination angle determining unit 211 outputs a value (θ1=−17°) in which the value 8° in the inclination sensor 20 at the point in time when the dead zone is exceeded is subtracted such that the main body 10 is inclined −9° backward with respect to the vertical direction in consideration of a downward hill. This cause the main body 10 to be inclined further backward, a higher torque for rotating the main wheel 11 backward is exerted, a stronger braking effect is exerted, and a force for pushing the user backward is obtainable.

The incline estimating unit 214 sets a new dead zone with reference to the value 8° in the inclination sensor 20 at the point in time when the dead zone is exceeded. In this example, the new dead zone is 5° to ∞. This causes the target inclination angle θ1 to be set again at the fifth angle in a case where the value in the inclination sensor 20 exceeds 8° and be fixed at the fifth angle until it falls below 5° again. In a case where the value in the inclination sensor 20 fells below 5°, the target inclination angle θ1 is set again at the third angle and a new dead zone of 0° to 8° is set again.

In this way, in a case where the value in the inclination sensor 20 exceeds the dead zone, the control unit 21 can achieve appropriate adjustment without necessarily having to set a dead zone having the same width (for example, ±5°) with reference to a value that exceeds the dead zone.

Figure 14B:
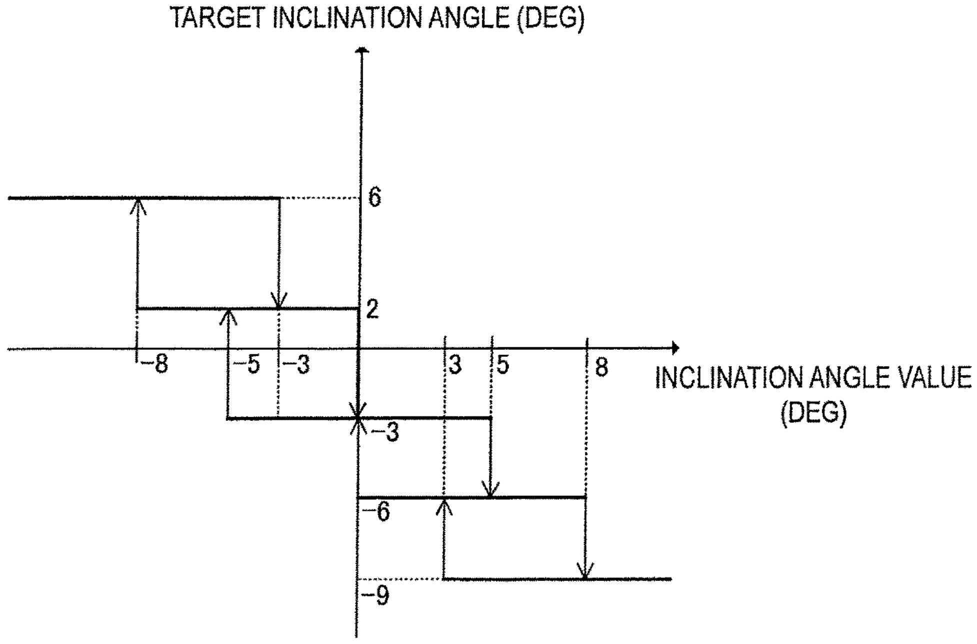

Next, FIG. 14B illustrates a relationship between the dead zone and the target inclination angle according to a second variation. In the second variation, in a case where the value in the inclination sensor 20 falls below −8°, the incline estimating unit 214 sets a new dead zone at −∞ to −3°. This causes the target inclination angle θ1 to be set again at the fourth angle in a case where the value in the inclination sensor 20 falls below −8° and be fixed at the fourth angle until it exceeds −3°, and a strong assisting force is maintained. In a case where the value in the inclination sensor 20 exceeds −3°, the target inclination angle θ1 is set again at the second angle and a new dead zone of −8° to 0° is set again. Similarly, in a case where the value in the inclination sensor 20 exceeds 8°, the incline estimating unit 214 sets a new dead zone of 3° to ∞. Thus, in a case where the value in the inclination sensor 20 exceeds 8°, the target inclination angle θ1 is set again at the fifth angle and is fixed at the fifth angle until it falls below 3°, and a strong braking effect is maintained. In a case where the value in the inclination sensor 20 falls below 3°, the target inclination angle θ1 is set again at the third angle and a new dead zone of 0° to 8° is set again.

In this manner, the borders of the dead zones are not necessarily the same value, and a form may also be used in which the value in the inclination sensor 20 to return to an original target inclination angle is set at a smaller value or larger value.

The used form of the hand-propelled vehicle in the present disclosure is not limited to the examples illustrated in the present embodiments. For example, a seat or the like may be provided on an upper portion of the box 30, and the hand-propelled vehicle 1 may also be used as an electric baby transport. The hand-propelled vehicle 1 may also be used as an electric hand truck including a flat portion where goods can be placed.

REFERENCE SIGNS LIST

1 hand-propelled vehicle
10 main body
11 main wheel
15 grip unit
20 inclination sensor
21 control unit
22 ROM
23 RAM
24 gyro sensor
25 drive unit
27 support-unit rotary encoder
30 box
112 support unit
113 auxiliary wheel
211 target inclination angle determining unit
212 target inclination angular velocity calculating unit
213 torque instruction generating unit
214 incline estimating unit
215 main-body inclination angle calculating unit

The invention claimed is:

1. A hand-propelled vehicle comprising:
a main body;
a plurality of main wheels being rotatable and supported by the main body;
a support unit coupled to a rotating shaft of each of the plurality of main wheels, the support unit being rotatable in a pitch direction;
one or more auxiliary wheels coupled to the support unit;
a drive unit configured to rotate the plurality of main wheels;
a control unit configured to control the drive unit;
a crossing-angle detecting unit configured to detect an angle between the main body and the support unit; and
a road-surface inclination angle detecting unit mounted on the support unit and configured to detect an inclination angle of a road surface in the pitch direction,
wherein the control unit is configured to calculate an inclination angle of the main body in the pitch direction with respect to a vertical axis on the basis of an output of the crossing-angle detecting unit and an output of the road-surface inclination angle detecting unit and to control the drive unit such that the inclination angle of the main body in the pitch direction with respect to the vertical axis is equal to a target inclination angle of the main body in the pitch direction.

2. The hand-propelled vehicle according to claim 1, wherein the road-surface inclination angle detecting unit includes at least one or more of an inclination sensor, a single-axis acceleration sensor, and a multi-axis acceleration sensor.

3. The hand-propelled vehicle according to claim 1, wherein the crossing-angle detecting unit includes at least one or more of a rotary encoder and a potentiometer.

4. The hand-propelled vehicle according to claim 1, wherein the target inclination angle is a predetermined angle with respect to the vertical axis.

5. The hand-propelled vehicle according to claim 1, wherein the target inclination angle is set by the control unit on the basis of the output of the road-surface inclination angle detecting unit.

6. The hand-propelled vehicle according to claim 1, wherein the main body includes an inclination angular velocity detecting unit configured to detect an inclination angular velocity of the main body in the pitch direction, and
the control unit is configured to control the drive unit on the basis of an output of the inclination angular velocity detecting unit such that the inclination angular velocity of the main body in the pitch direction is zero.

7. The hand-propelled vehicle according to claim 6, wherein the inclination angular velocity detecting unit uses a differential value of an output of a gyro sensor attached to the main body or the crossing-angle detecting unit.

8. The hand-propelled vehicle according to claim 1, wherein the control unit is configured to set a dead zone where a change in the output of the inclination angle detecting unit is not used in setting the target inclination angle again with reference to an output value of the crossing-angle detecting unit in a case where the hand-propelled vehicle is on a flat surface, the control unit is configured to set the target inclination angle again and set a new dead zone again with reference to an output value of the inclination angle detecting unit at the point in time when the dead zone is exceeded in a case where the output of the inclination angle detecting unit exceeds the dead zone.

9. The hand-propelled vehicle according to claim 8, the control unit is configured to set the target inclination angle on the basis of the output of the inclination angle detecting unit, and
the control unit is configured to set the target inclination angle again in a case where the output of the inclination angle detecting unit exceeds the dead zone.

10. The hand-propelled vehicle according to claim 8, further comprising acceleration detecting means that is configured to detect acceleration of the main body in the pitch direction, and
wherein the control unit is configured to change the dead zone in accordance with the acceleration detected by the acceleration detecting means.

11. The hand-propelled vehicle according to claim 2, wherein the crossing-angle detecting unit includes at least one or more of a rotary encoder and a potentiometer.

12. The hand-propelled vehicle according to claim 2, wherein the target inclination angle is a predetermined angle with respect to the vertical axis.

13. The hand-propelled vehicle according to claim 3, wherein the target inclination angle is a predetermined angle with respect to the vertical axis.

14. The hand-propelled vehicle according to claim 2, wherein the target inclination angle is set by the control unit on the basis of the output of the road-surface inclination angle detecting unit.

15. The hand-propelled vehicle according to claim 3, wherein the target inclination angle is set by the control unit on the basis of the output of the road-surface inclination angle detecting unit.

16. The hand-propelled vehicle according to claim 2, wherein the main body includes an inclination angular velocity detecting unit configured to detect an inclination angular velocity of the main body in the pitch direction, and the control unit is configured to control the drive unit on the basis of an output of the inclination angular velocity detecting unit such that the inclination angular velocity of the main body in the pitch direction is zero.

17. The hand-propelled vehicle according to claim 3, wherein the main body includes an inclination angular velocity detecting unit configured to detect an inclination angular velocity of the main body in the pitch direction, and the control unit is configured to control the drive unit on the basis of an output of the inclination angular velocity detecting unit such that the inclination angular velocity of the main body in the pitch direction is zero.

18. The hand-propelled vehicle according to claim 4, wherein the main body includes an inclination angular velocity detecting unit configured to detect an inclination angular velocity of the main body in the pitch direction, and the control unit is configured to control the drive unit on the basis of an output of the inclination angular velocity detecting unit such that the inclination angular velocity of the main body in the pitch direction is zero.

19. The hand-propelled vehicle according to claim 5, wherein the main body includes an inclination angular velocity detecting unit configured to detect an inclination angular velocity of the main body in the pitch direction, and the control unit is configured to control the drive unit on the basis of an output of the inclination angular velocity detecting unit such that the inclination angular velocity of the main body in the pitch direction is zero.

* * * * *